United States Patent
Eguchi (10) Patent No.: US 10,784,803 B2
(45) Date of Patent: Sep. 22, 2020

(54) POSITION CONTROL DEVICE (71) Applicant: OKUMA Corporation, Niwa-gun, Aichi (JP)

(72) Inventor: Satoshi Eguchi, Aichi (JP)

(73) Assignee: OKUMA CORPORATION, Niwa-Gun, Aichi (JP)

( * ) Notice: Subject to any disclaimer, the term of this patent is extended or adjusted under 35 U.S.C. 154(b) by 0 days.

(21) Appl. No.: 16/441,542

(22) Filed: Jun. 14, 2019

(65) Prior Publication Data
US 2019/0393817 A1 Dec. 26, 2019

(30) Foreign Application Priority Data

Jun. 22, 2018 (JP) ................................. 2018-119061

(51) Int. Cl.
| H02P 21/00 | (2016.01) |
| H02P 21/12 | (2016.01) |
| H02P 21/22 | (2016.01) |
| H02P 21/09 | (2016.01) |
| H02P 27/12 | (2006.01) |
| G05B 19/19 | (2006.01) |

(52) U.S. Cl.
CPC ............. *H02P 21/09* (2016.02); *H02P 21/22* (2016.02); *H02P 27/12* (2013.01); *G05B 19/19* (2013.01); *G05B 2219/37298* (2013.01)

(58) Field of Classification Search
None
See application file for complete search history.

(56) References Cited

U.S. PATENT DOCUMENTS

| 6,066,934 A * | 5/2000 | Kaitani | H02P 23/08 318/490 |
| 7,224,133 B2 * | 5/2007 | Nakatsugawa | H02P 6/10 318/400.01 |
| 7,391,180 B2 * | 6/2008 | Armiroli | B60K 6/485 180/65.1 |
| 2008/0007198 A1 * | 1/2008 | Kinpara | H02P 21/14 318/807 |
| 2012/0319629 A1 * | 12/2012 | Takaki | H02M 7/53875 318/400.02 |

* cited by examiner

*Primary Examiner* — Bentsu Ro
(74) *Attorney, Agent, or Firm* — Cantor Colburn LLP (57) ABSTRACT

A position control device includes a subtracter for subtracting a q-axis current detection value iq from a q-axis current command value iq* to output a q-axis current error Δiq, an adder for adding a q-axis current compensation amount iqc* for compensating for response timing of q-axis current to the q-axis current error Δiq, a q-axis current controller for amplifying an output of the adder by I-P control to calculate a q-axis voltage error Δvq and calculating a q-axis voltage command value vq* on the basis of the q-axis voltage error Δvq, and a second adder for adding a q-axis voltage feedforward amount vqf corresponding to a time derivative value s·iq of the q-axis current to the q-axis voltage command value vq* to calculate a final q-axis voltage command value.

2 Claims, 12 Drawing Sheets

POSITION CONTROL DEVICE

CROSS REFERENCE TO RELATED APPLICATION

The present invention claims priority under 35 U.S.C. § 119 to Japanese Patent Application No. 2018-119061 filed on Jun. 22, 2018, the entire content of which is incorporated herein by reference.

TECHNICAL FIELD

The present specification discloses a position control device that controls current for an electric motor (for example, a synchronous motor or an induction motor) and thereby controls a speed or rotation angle (position) of a feed axis or main axis and adopts a PWM invertor as a power converter.

BACKGROUND

A position control device that controls the speed or rotation angle (position) of the feed axis or main axis of a numerical control machine tool often controls a three-phase synchronous motor or induction motor (hereinafter also referred to as a motor) to drive a load such as a table or workpiece connected to the motor. In this configuration, a PWM inverter is usually adopted as the power converter.

Conventionally, motor control requires use of a two-phase rotational coordinate system (generally, a magnetic pole direction is referred to as a d-axis and its electrically orthogonal direction as a q-axis) and calculation of two-phase voltage command values (vd*, vq*) for controlling motor current, as well as application of three-phase conversion and determination of three-phase control voltage command values (vu*, vv*, vw*). Furthermore, the three-phase control voltage command values are power-amplified by the PWM inverter to serve as phase voltages (vu, vv, vw) for driving the motor.

However, conventional position control devices have a problem in that a voltage output becomes discontinuous when a current direction reverses due to an impact of a dead time that occurs at the time of switching of a power conversion element such as a transistor adopted in the PWM inverter, and a DIF ripple of a current direction reversal number occurs in position deviation DIF, disturbing a work machining surface, whereby machined surface quality decreases.

For the problem of decrease in the machined surface quality caused by the DIF ripple due to the dead time, the impact has been conventionally reduced by dead time compensation as described above. However, it is not easy to accurately detect the current direction and precisely switch a dead time compensation value, and there has been a limit to the DIF ripple reduction by the dead time compensation.

The present specification discloses a position control device that reduces the DIF ripple due to the dead time by improving voltage disturbance suppression performance and that achieves improvement of command following performance and optimization of command response timing.

SUMMARY

A position control device disclosed herein includes an error amplifier that amplifies a q-axis current error by I-P (Integration-Proportion) control, and adds a q-axis voltage feedforward amount corresponding to a q-axis current command time derivative value to a q-axis voltage command value, and adds a q-axis current compensation amount for optimizing response timing of q-axis current to a q-axis current error.

By configuring a q-axis current control loop by the I-P (Integration-Proportion) control, it is possible to improve voltage disturbance suppression performance and reduce a DIF ripple due to the dead time. In addition, by the q-axis voltage feedforward corresponding to a jerk command value, it is possible to compensate for a q-axis voltage error and improve position command value following performance. Furthermore, since the q-axis current compensation amount allows for adjusting q-axis current response timing, DIF occurrence during acceleration/deceleration operation can be suppressed, and a positional synchronous relationship with other control axes operated by PI control can be maintained.

BRIEF DESCRIPTION OF DRAWINGS

Embodiment(s) of the present disclosure will be described based on the following figures, wherein.

EMBODIMENTS

Figure 12:
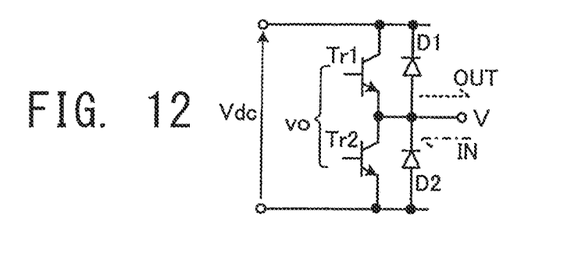
FIG. 12 is a circuit diagram illustrating a voltage output unit for one phase of a PWM inverter.

First, a DIF ripple will be explained with reference to a comparison example. FIG. 12 is a circuit diagram illustrating a voltage output unit for one phase of a PWM inverter.

By performing high-speed switching control of on/off of a transistor Tr1 and a transistor Tr2, a phase voltage V output from a circuit of DC voltage Vdc can be changed between 0 and Vdc in average. A control voltage command value vo is to command on/off of the two transistors, V=Vdc while the TR1 is on, and V=0 while the TR2 is on. A diode D1 and a diode D2 are for reflux.

Figure 13:
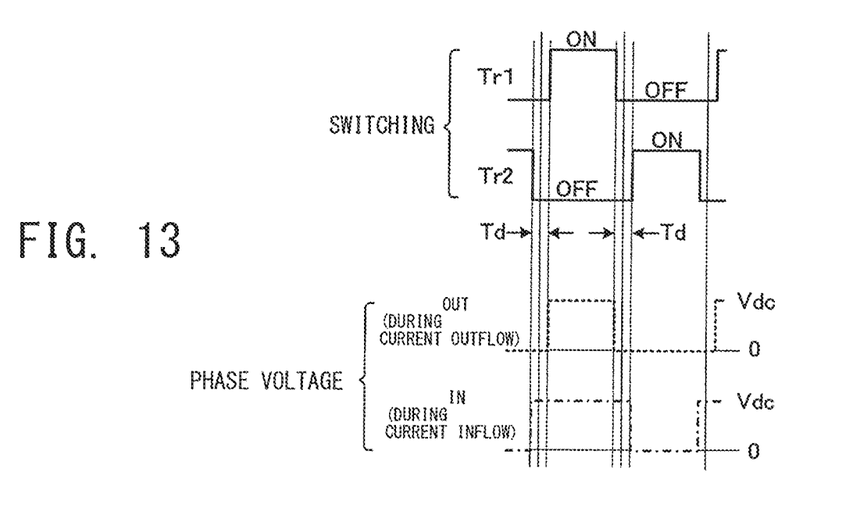
FIG. 13 is a time chart illustrating a control voltage command value and an output phase voltage for one phase of the PWM inverter.

FIG. 13 shows an output phase voltage V when the transistor Tr1 and the transistor Tr2 are switched by a certain control voltage command value vo. The upper side of FIG. 13 is an example of the control voltage command value vo. A dead time Td is a pause time for preventing both transistors from turning on simultaneously and causing short circuit breakdown.

The lower side of FIG. 13 is an output phase voltage V of the PWM inverter at this time. During current outflow OUT, the transistor Tr1 is off and current flows through the diode D2, and the output voltage becomes 0, and during current inflow IN, the transistor Tr2 is off and current flows through the diode D1, and the output voltage becomes Vdc. That is, even if the same control voltage command value vo is applied to the transistors, a difference due to current directions occurs in an output average phase voltage V.

Figure 14:
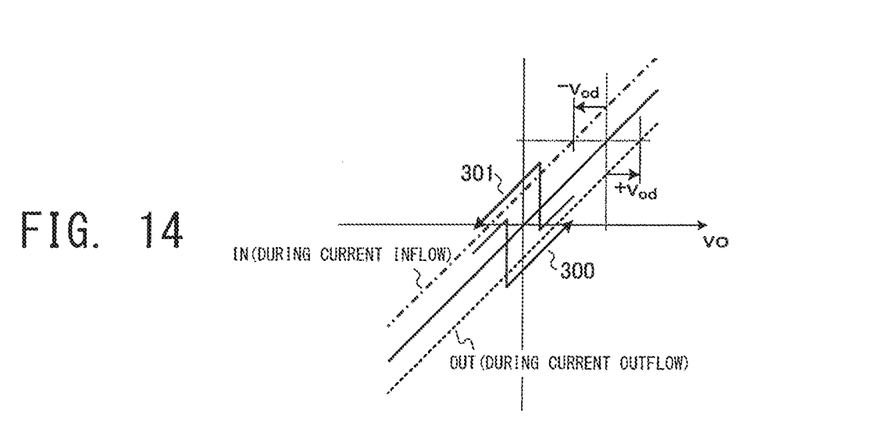
FIG. 14 is a diagram illustrating an input-output relationship (control voltage command value-output phase voltage) for one phase of the PWM inverter.

FIG. 14 is a diagram illustrating an input-output relationship for one phase of the PWM inverter with the control voltage command value vo on the horizontal axis and the output phase voltage V on the vertical axis. However, the control voltage command value vo and output phase voltage V are both expressed as an average voltage corresponding to an on/off duty. A dotted line indicates an input-output relationship during the current outflow OUT, and an alternate long and short dashed line indicates an input-output relationship during the current inflow IN. A solid line represents an ideal linear characteristic.

Since the output phase voltage V changes as indicated by an arrow 300 when the current direction changes from the current inflow IN to the current outflow OUT, and changes as indicated by an arrow 301 when the current direction changes from the current outflow OUT to the current inflow IN, the output phase voltage V becomes discontinuous, as a result a current response delays, and positional deviation DIF occurs as the position control device.

Therefore, dead time compensation processing is conventionally performed so that the output phase voltage V is on the solid line showing the ideal linear characteristic by previously adding, to the control voltage command value vo, a dead time compensation value −vod during the current inflow IN and a dead time compensation value +vod during the current outflow OUT and setting a resulting value as an input voltage to the PWM inverter.

Figure 7:
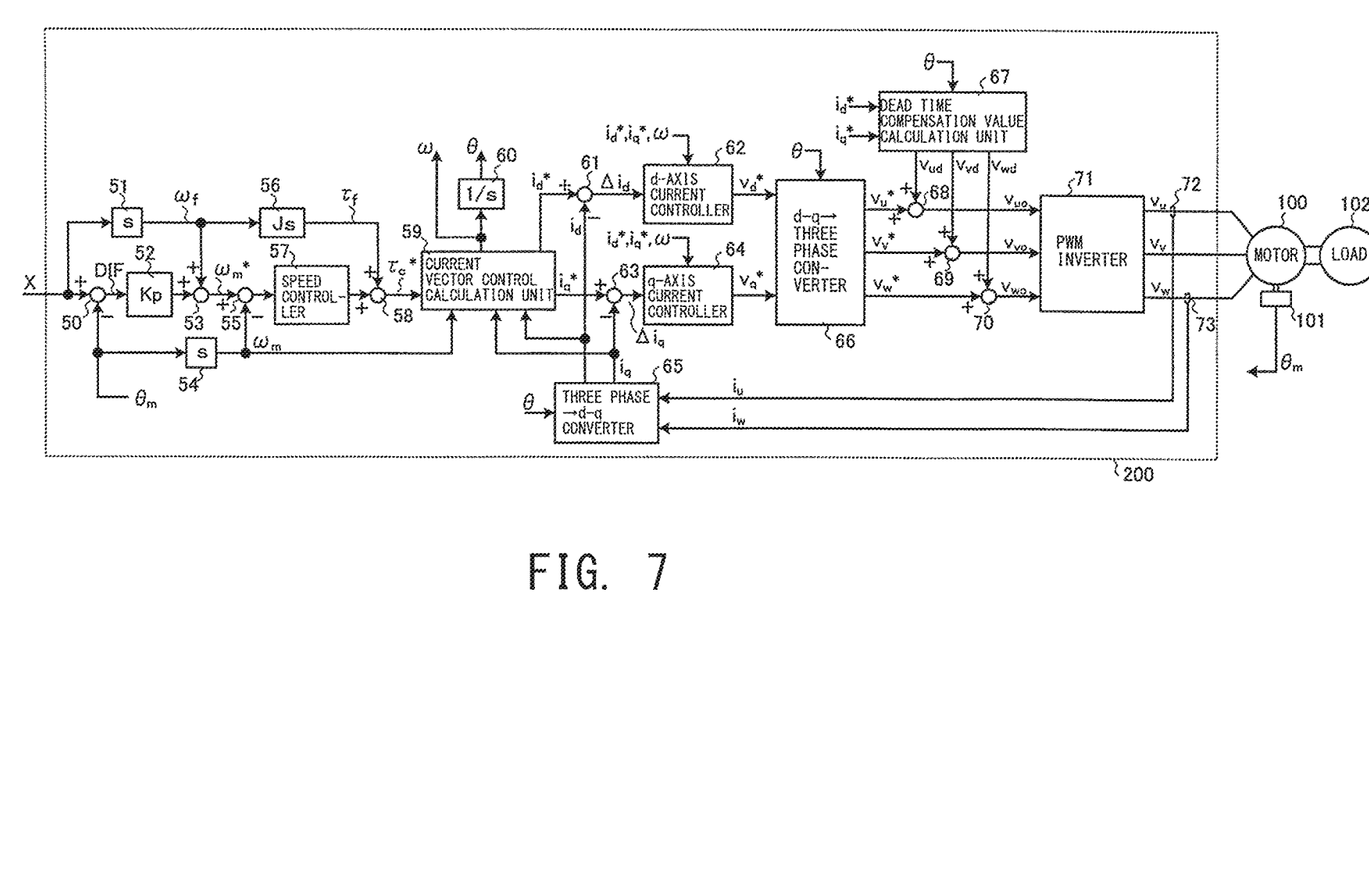
FIG. 7 is a block diagram illustrating an exemplary configuration of a position control device of a comparative example.

FIG. 7 is a block diagram illustrating an exemplary configuration of a position control device 200 of a comparative example. A position command value X is output from a higher device (not shown) to the position control device 200 of the example. A rotation angle θm of a motor 100 output from a position detector 101 is a position detection value that indicates the position of a load 102 connected with and driven by the motor, and is subtracted from the position command value X by a subtracter 50 whose output is the position deviation DIF.

The position deviation DIF is amplified by position loop gain Kp times by a position deviation amplifier 52. In the example, a feedforward configuration is adopted in order to accelerate a command response. Therefore, the position command value X is differentiated by time by a differentiator 51 and results in a speed feedforward amount ωf. The speed feedforward amount ωf is amplified by total inertia moment J times including the load after being differentiated by time by a differential amplifier 56, and results in a torque feedforward amount τf necessary for acceleration/deceleration operation corresponding to acceleration of the position command value. Note that "s" of the differentiator 51 denotes a differential operator of Laplace transform.

An adder 53 adds the output of the position deviation amplifier 52 and the speed feedforward amount ωf to output a speed command value ωm*. On the other hand, a differentiator 54 differentiates a position detection value θm by time to output a speed detection value ωm. A subtracter 55 subtracts the speed detection value ωm from the speed command value ωm*, and speed deviation which is an output of the subtracter 55 is amplified by PI (Proportional Integration) by a speed controller 57. An output of the speed controller 57 and the acceleration/deceleration torque feedforward amount τf are added by an adder 58 to result in a torque command value τc* of the motor.

A current vector control calculation unit 59 is a calculation unit that calculates and outputs a q-axis current command value iq*, a d-axis current command value id*, and a power supply angular frequency ω. In a magnet type synchronous motor (PMSM) such as a surface magnet type (SPM), an embedded magnet type (IPM), or a reluctance type, the current vector control calculation unit 59 calculates the q-axis current command value iq* and d-axis current command value id* from an N-τ (speed-torque) characteristic of the motor and the speed detection value ωm with respect to the torque command value τc*.

In an induction motor (IM), the current vector control calculation unit 59 calculates the d-axis current command value id* from the N-τ (speed-torque) characteristic of the motor and the speed detection value ωm and calculates the q-axis current command value iq* from the torque command value τc* and a d-axis current detection value id. Furthermore, the current vector control calculation unit 59 calculates a slip angular frequency ωs from the d-axis current detection value id and a q-axis current detection value iq, and adds it and a motor pair-pole number times the speed detection value ωm (not shown) to calculate the power supply angular frequency ω.

Generally, torque is controlled by the q-axis current in a two-phase rotational coordinate system, so the q-axis current is hereafter referred to as torque current or torque, depending on the situation. Note that the magnet type synchronous motor (PMSM) is controlled in the slip angular frequency ωs=0, so the power supply angular frequency ω output from the current vector control calculation unit 59 is the motor pair-pole number times the speed detection value ωm. An integrator 60 integrates the power supply angular frequency ω by time to output a power supply phase angle θ.

U-phase current iu and W-phase current iw of the motor are detected by current detectors 72 and 73. Note that V-phase current iv can be calculated by iv=−(iu+iw). A three phase→d-q converter 65 calculates and outputs d-axis current id and q-axis current iq from the U-phase current iu, W-phase current iw, and power supply phase angle θ by coordinate conversion.

A subtracter 61 subtracts the d-axis current id from the d-axis current command value id* to calculate a d-axis current error Δid. A d-axis current controller 62 includes an error amplifier for amplifying the d-axis current error Δid by PI (Proportional Integration) and a non-interfering compensation unit (not shown) for compensating for an interference component with the q-axis from the q-axis current command value iq* and power supply angular frequency ω. The d-axis current controller 62 adds an error amplifier output and a non-interfering compensation value to output a d-axis voltage command value vd*.

A subtracter 63 subtracts the q-axis current iq from the q-axis current command value iq* to calculate a q-axis current error Δiq. A q-axis current controller 64 includes an error amplifier for amplifying the q-axis current error Δiq by the PI (Proportional Integration), a non-interfering compensation unit (not shown) for compensating an interference component with the d-axis from the d-axis current command value id* and power supply angular frequency ω, and an induced voltage compensation unit (not shown) for compensating for induced voltage of the motor. The q-axis current controller 64 adds an error amplifier output, a non-interfering compensation value, and an induced voltage compensation value to output a q-axis voltage command value vq*.

A d-q→three phase converter 66 calculates and outputs a U-phase control voltage command value vu*, a V-phase control voltage command value vv*, and a W-phase control voltage command value vw* from the d-axis voltage command value vd*, the q-axis voltage command value vq*, and the power supply phase angle θ by coordinate conversion.

A dead time compensation value calculation unit 67 performs d-q→three phase conversion (not shown) to calculate and output each phase current command value of the U phase, the V phase, and the W phase from the d-axis current command value id*, the q-axis current command value iq*, and the power supply phase angle θ by coordinate conversion, and calculates the above-described dead time compensation value (vud, vvd, and vwd) for each phase in order to compensate for phase voltage becoming discontinuous during direction reverse of the current command value.

An adder 68 adds the dead time compensation value vud to the U-phase control voltage command value vu* and outputs a U-phase control voltage command value vuo after the dead time compensation. Also, an adder 69 and an adder 70 add the dead time compensation values (vvd, vwd) to the phase control voltage command values (vv*, vw*) and output a V-phase control voltage command value vvo and a W-phase control voltage command value vwo after the dead time compensation, respectively.

As described above, a PWM inverter 71 inputs thereinto the phase control voltage command values (vuo, vvo, vwo) after the dead time compensation, power amplifies them, and outputs phase voltages (vu, vv, vw) for driving the motor. The output phase voltages are applied to the respective phases of the motor to generate respective phase currents.

Figure 8:
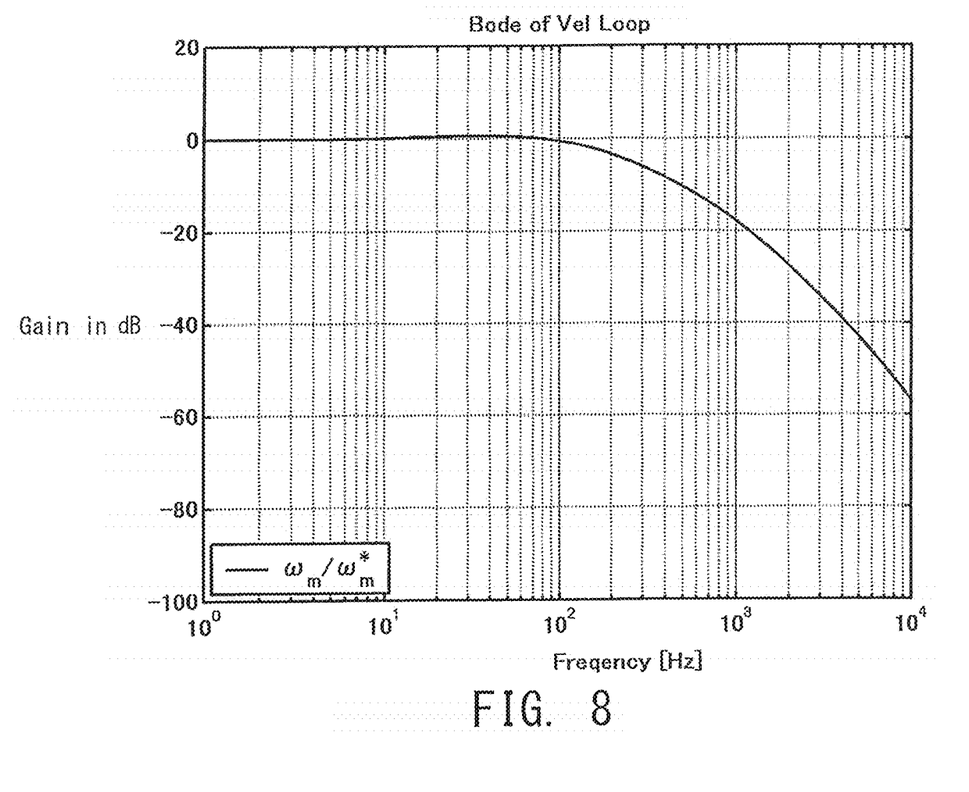
FIG. 8 is a graph showing an example of a speed loop frequency characteristic (ωm/ωm*) in the position control device of the comparative example.

FIG. 8 shows a speed loop frequency characteristic from the speed command value ωm* to the speed detection value ωm by suitably adjusting proportional gain and integral gain in a PI control system of the d-axis current controller 62, the q-axis current controller 64, and the speed controller 57 of the position control device 200 shown in FIG. 7. In this case, a speed control band (−3 dB down of gain) is about 200 Hz. (Note that this characteristic is evaluated assuming that the speed feedforward amount ωf, the torque feedforward amount τf, and a position loop gain Kp are 0.)

Next, the above-described impact of the dead time causes discontinuity of the output voltage as shown in FIG. 14, so it can be considered as voltage disturbance to the position control device 200. Therefore, by forming the q-axis voltage command value vq* by adding voltage disturbance vdis (not shown) to the output of the q-axis current controller 64 of FIG. 7 after suitably setting the position loop gain Kp, a response of the q-axis current iq to the voltage disturbance vdis is evaluated.

Figure 9:
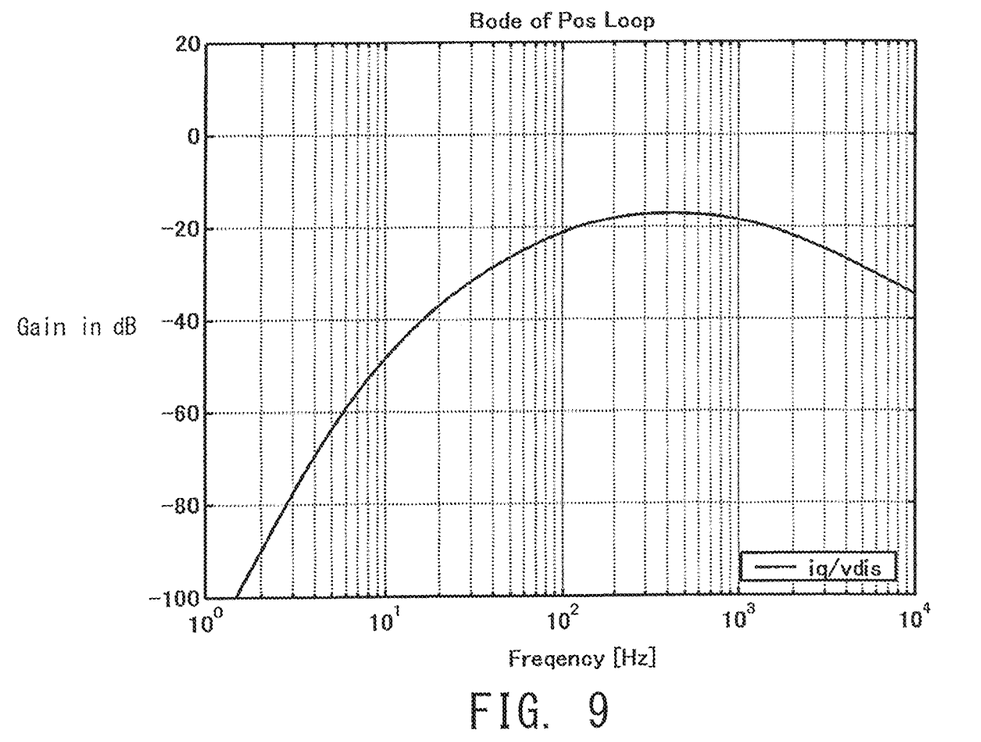
FIG. 9 is a graph showing an example of a position loop frequency characteristic (iq/vdis) in the position control device of the comparative example.
Figure 10:
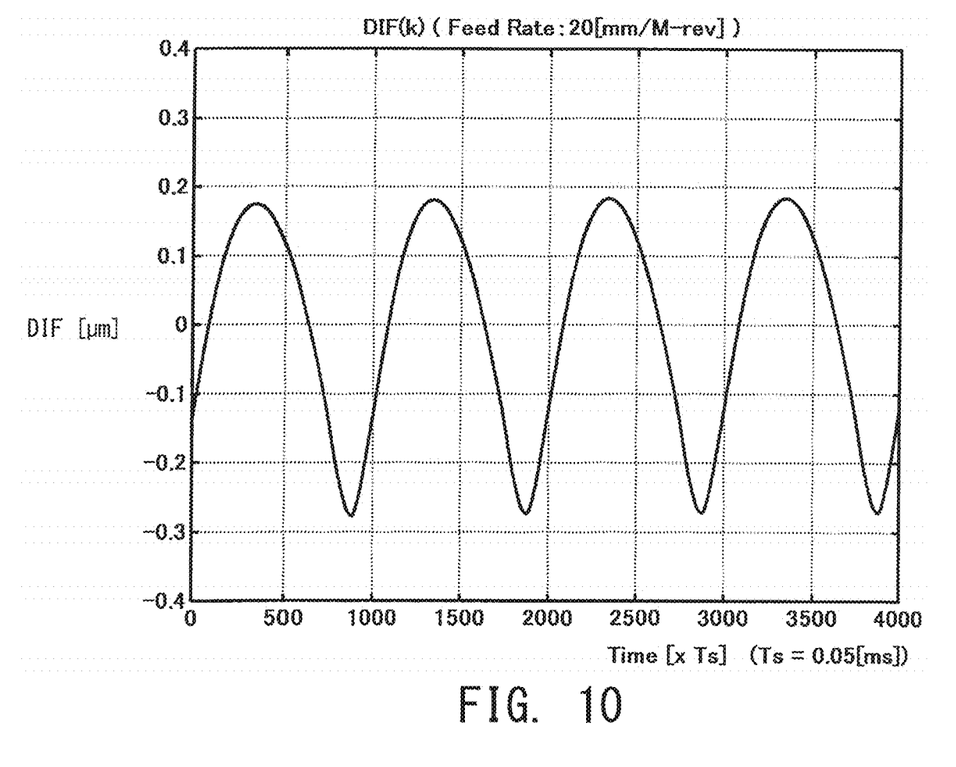
FIG. 10 is a graph showing an example of a DIF ripple due to a dead time in the position control device of the comparative example.

FIG. 9 shows a position loop frequency characteristic of voltage disturbance suppression performance (iq/vdis) of the position control device 200. Because the q-axis current iq is proportional to the torque, a ripple of the q-axis current iq is proportional to a speed and position ripple; that is, a DIF ripple. FIG. 10 shows a DIF ripple generated when the motor is operated at a constant speed at which the total of current direction reversal numbers of the phase currents is 20 times per second (20 Hz) after setting an appropriate dead time and dead time compensation value. In this case, a DIF ripple of 0.4-0.5 μm on both side amplitude in length conversion (20 mm per rotation of the motor) occurs.

For the problem of decrease in machined surface quality caused by the DIF ripple due to the dead time, the impact has been conventionally reduced by the dead time compensation as described above. It is not easy, however, to accurately detect the current direction and precisely switch the dead time compensation value, and there has been a limit to the DIF ripple reduction by the dead time compensation.

Figure 1:
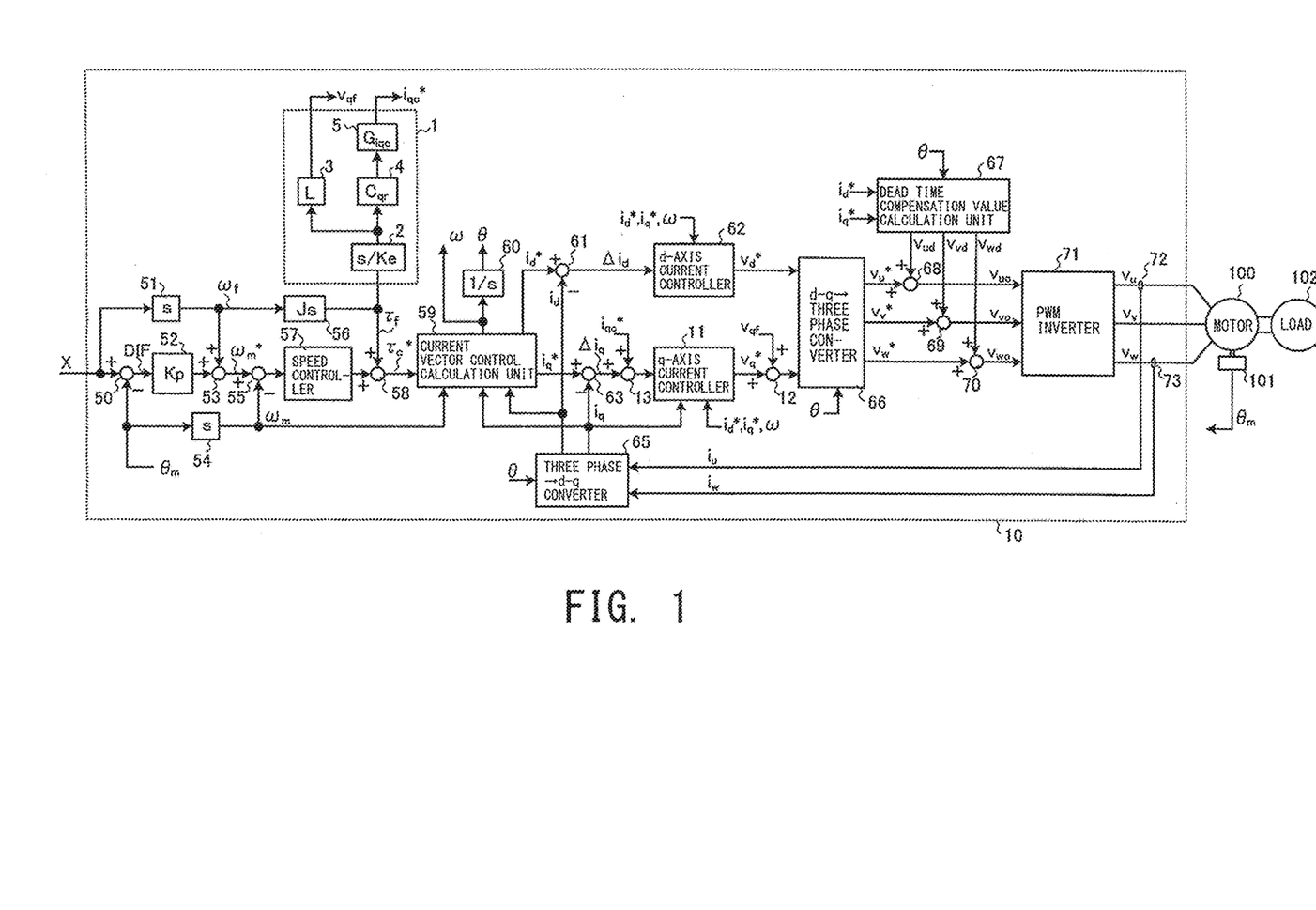
FIG. 1 is a block diagram illustrating an exemplary configuration of a position control device.

A position control device in FIG. 1 is a position control device configured for reducing the DIF ripple as one advantage. This position control device will be described below with reference to figures. FIG. 1 is a block diagram illustrating an exemplary configuration of the position control device. Hereinafter, only differences from the comparative example described above will be described. In addition, FIG. 1 illustrates the case of the surface magnet type synchronous motor (SPM).

In the position control device 10 in FIG. 1, an adder 13 adds a q-axis current compensation amount iqc* to a q-axis current error Δiq and inputs a resulting value into a q-axis current controller 11. The q-axis current compensation amount iqc* is a compensation input for adjusting a torque response time, and a calculation output of a later-described q-axis response compensation amount calculation unit 1. In addition, the q-axis current iq is added to the input of the q-axis current controller 11.

An error amplifier of the q-axis current controller 11 uses I-P (Integration-Proportion) control. The I-P control is a known control method and a calculation expression in this case is shown by an expression (1):

[Expression 1]

$$\frac{G_{cqi}}{s}(\Delta i_q + i^*_{qc}) - G_{cqp} \cdot i_q = \Delta v_q \tag{1}$$

where, a q-axis voltage error Δvq is an output of the I-P control, and Gcqi denoting integral gain and Gcqp denoting proportional gain are gain parameters involved in the I-P control.

The q-axis current controller 11 includes, other than the error amplifier for I-P (Integration-Proportion) amplification, a non-interfering compensation unit for compensating for an interference component with the d-axis from the d-axis current command value id* and power supply angular frequency ω and an induced voltage compensation unit for compensating induced voltage of the motor in the same manner as the comparative example. That is, the q-axis current controller 11 adds a non-interfering compensation value ωL·id and an induced voltage compensation value Ke(ω/p) to the q-axis voltage error Δvq which is an output of the I-P control and outputs a q-axis voltage command value vq*. This series of processing is expressed by an expression (2):

[Expression 2]

$$Vq^* = \Delta vq + \omega L i d + K e(\omega/p) \quad (2),$$

where p denotes a pair-pole number, L an inductance per phase, and Ke a torque constant.

An adder 12 adds a q-axis voltage feedforward amount vqf to the q-axis voltage command value vq* which is an output of the q-axis current controller 11 and forms a q-axis voltage command value which is an input to a d-q→three phase converter 66. The q-axis voltage feedforward amount vqf is a q-axis voltage compensation value that compensates for the q-axis voltage error Δvq generated corresponding to a jerk command value to make Δvq=0 and is a calculation output of the later-described q-axis response compensation amount calculation unit 1.

FIG. 1 shows the q-axis response compensation amount calculation unit 1 that has a block configuration in the case of the surface magnet type synchronous motor (SPM). A q-axis voltage vq generated by time change of the q-axis current iq is shown by expression (3).

[Expression 3]

$$vq = sL \cdot iq \quad (3)$$

A differential amplifier 2 divides the acceleration/deceleration torque feedforward amount τf by a torque constant Ke for time differentiation and outputs a time derivative value s·iq of the q-axis current. Since the acceleration/deceleration torque feedforward amount τf is a torque command value proportional to an acceleration command value, this q-axis current is also proportional to the acceleration command value.

Since an amplifier 3 amplifies the output of the differential amplifier 2 by the inductance L times, its output becomes the q-axis voltage vq generated by time change of the q-axis current iq of the expression (3). Here, the q-axis current and torque and acceleration have a proportional relationship, the q-axis current time derivative value s·i is proportional to jerk. That is, the q-axis voltage vq becomes the q-axis voltage feedforward amount vqf corresponding to a jerk command value.

By performing the above-described compensation processing from a well-known dq coordinate system voltage equation of the SPM, the q-axis voltage error Δvq of the expression (1) can be made Δvq=0 including during acceleration/deceleration operation. On the other hand, in the I-P control, since command following performance in a high-frequency band is deteriorated as compared with the PI control, a q-axis current response; that is, a torque response tends to be delayed.

The q-axis current compensation amount iqc*, which is an output of the q-axis response compensation amount calculation unit 1, compensates for the delay of the torque response. When the expression (1) is solved for the q-axis current error Δiq, an expression (4) is obtained because, in addition to Δvq=0, s·iq→s·iq* holds under constant jerk.

[Expression 4]

$$\Delta i_q = \frac{G_{cqp}}{G_{cqi}}(s \cdot i_q^*) - i_{qc}^* \quad (4)$$

Therefore, when the q-axis current compensation amount iqc* is set by an expression (5), the q-axis current error Δiq is expressed by an expression (6).

[Expression 5]

$$i_{qc}^* = G_{iqc} \frac{G_{cqp}}{G_{cqi}}(s \cdot i_q^*) \quad (5)$$

[Expression 6]

$$\Delta i_q = (1 - G_{iqc}) \frac{G_{cqp}}{G_{cqi}}(s \cdot i_q^*) \quad (6)$$

In the expression (6), the q-axis current error Δiq is proportional to a q-axis current command time derivative value s·iq*. That is, under the constant jerk, a q-axis current response iq is delayed by a constant time with respect to the q-axis current command value iq*, which indicates that its q-axis current response delay time can be adjusted by an interpolation constant Giqc.

Because the output of the differential amplifier 2 can be regarded as the q-axis current command time derivative value s·iq* in FIG. 1, assuming that an amplification factor Cqr of an amplifier 4 is Cqr=Gcqp/Gcqi, the q-axis current compensation amount iqc* of the expression (5) can be derived by amplifying the output by the interpolation constant Giqc of an amplifier 5.

Figure 2:
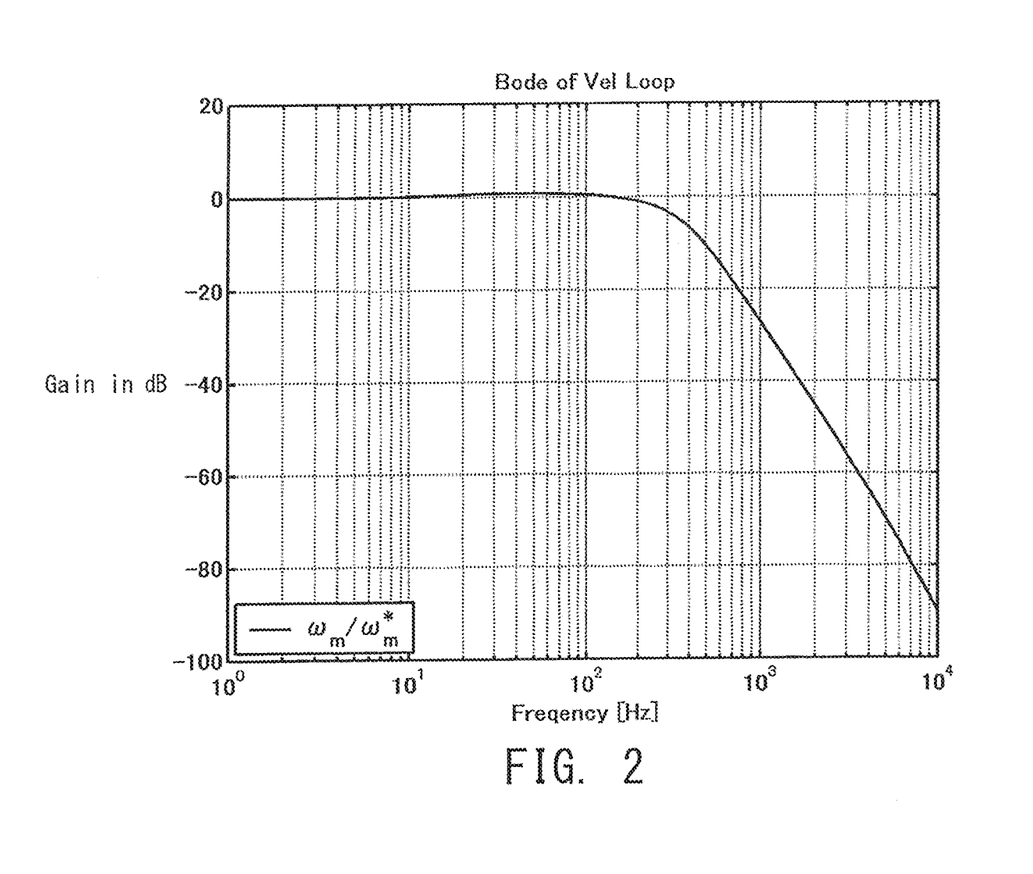
FIG. 2 is a graph showing an example of a speed loop frequency characteristic (ωm/ωm*) in the position control device of FIG. 1.

FIG. 2 corresponds to FIG. 8 of the comparison example, and shows a speed loop frequency characteristic from the speed command value ωm* to the speed detection value ωm by suitably adjusting the proportional gain Gcqp and integral gain Gcqi in the I-P control of the q-axis current controller 11 of the position control device 10 shown in FIG. 1. Note that the proportional gain and integral gain of the d-axis current controller 62 and the speed controller 57 are adjusted to the same values as in FIG. 8. In this case, a speed control band is about the same as in FIG. 8.

Figure 3:
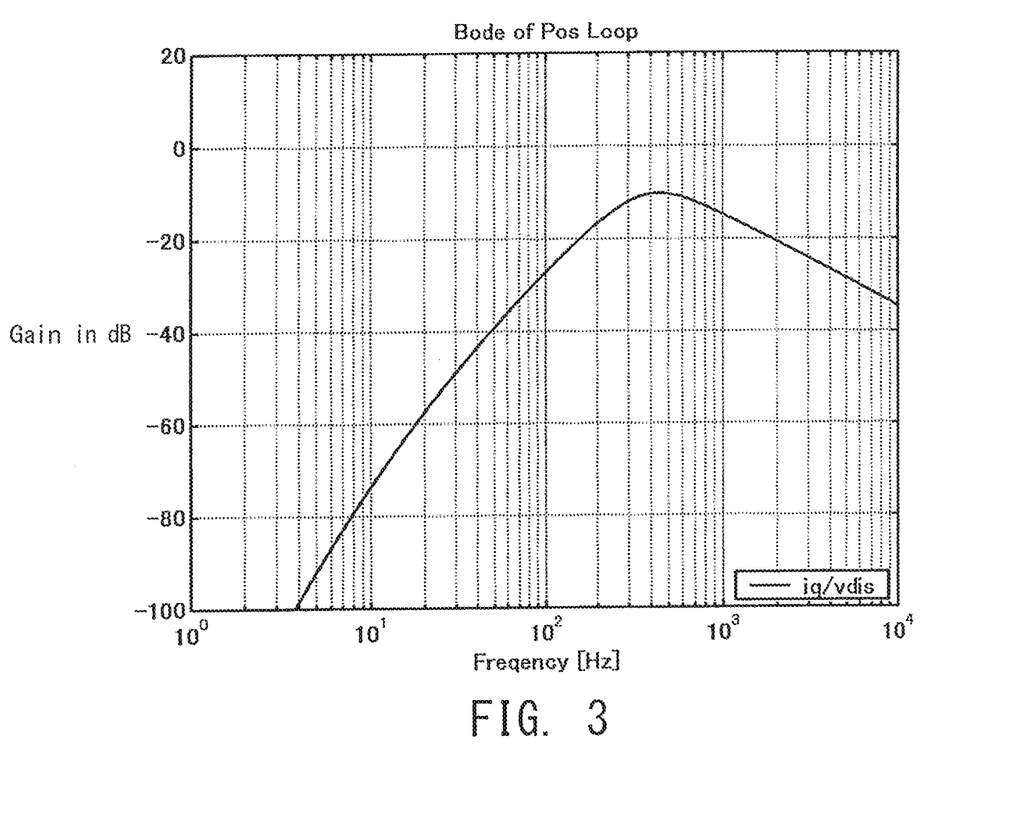
FIG. 3 is a graph showing an example of a position loop frequency characteristic (iq/vdis) in the position control device of FIG. 1.
Figure 4:
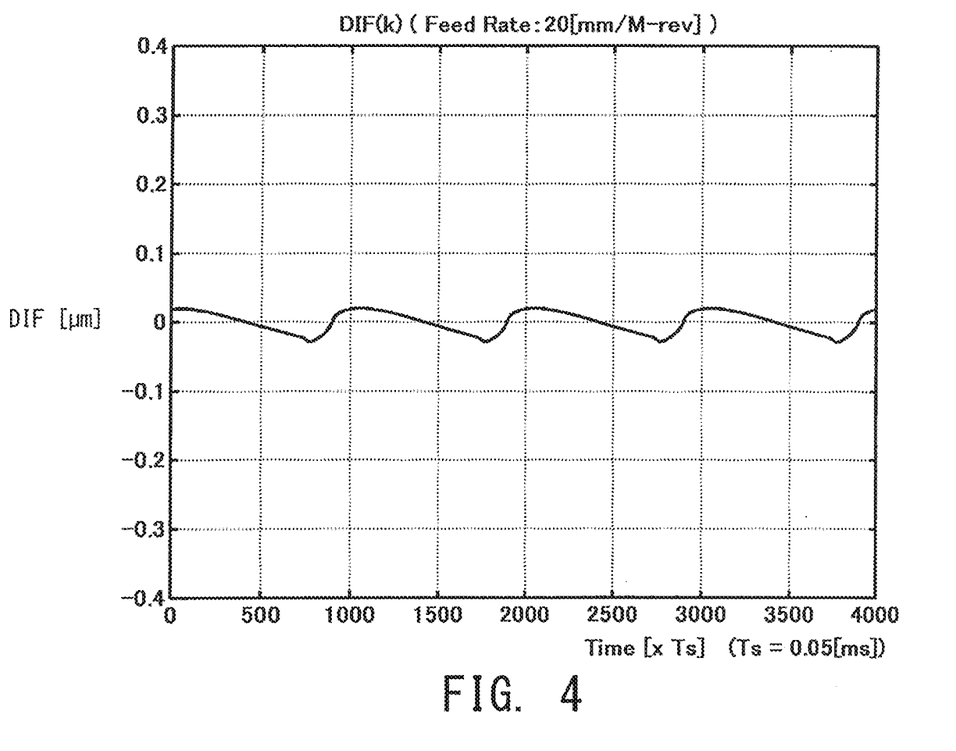
FIG. 4 is a graph showing an example of a DIF ripple due to a dead time in the position control device of FIG. 1.

FIG. 3 corresponds to FIG. 9 of the comparison example, and shows a position loop frequency characteristic of voltage disturbance suppression performance (iq/vdis) of the position control device 10 shown in FIG. 1. Note that the position loop gain Kp is adjusted to the same value as in FIG. 9. The DIF ripple in the example is shown in FIG. 4.

Here, the dead time, the dead time compensation value, and the motor speed are set to the same values as in FIG. 10. In FIG. 4, the DIF ripple is about 0.05 μm in both-side amplitude and can be suppressed by about ¹⁄₁₀ as compared with FIG. 10 of the comparative example. This is the same for the DIF ripple generated due to the dead time.

Figure 5:
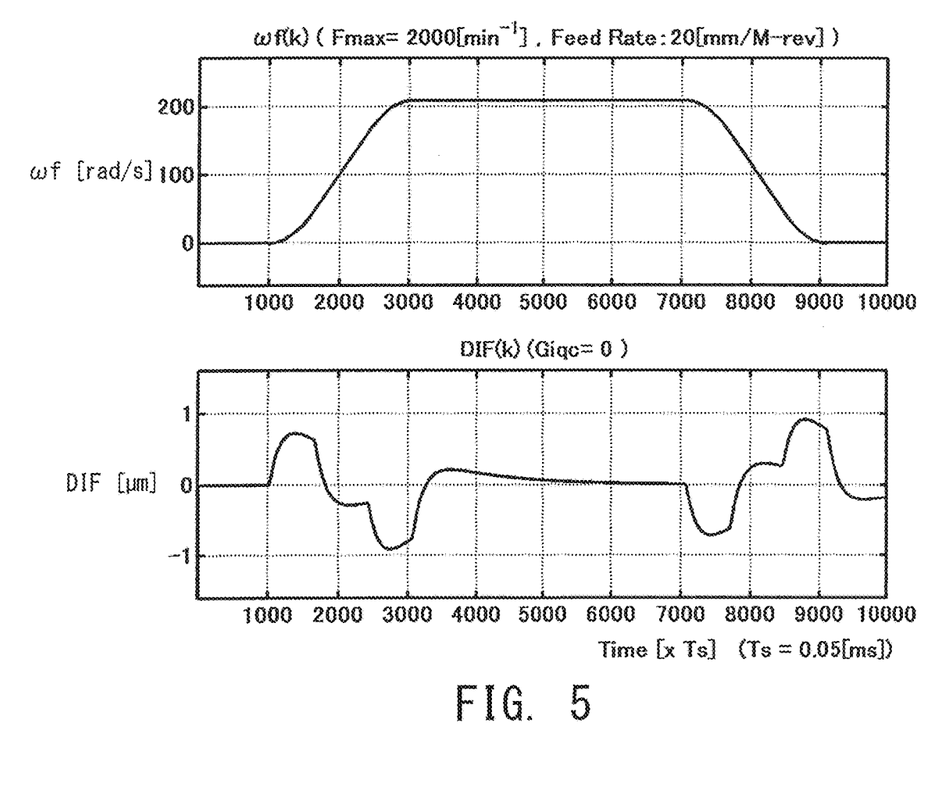
FIG. 5 is a graph showing an example of a following error during acceleration/deceleration in the position control device of FIG. 1.

Next, consideration is given to the position deviation DIF when an S-shaped acceleration/deceleration position command value X is input to the position control device 10 shown in FIG. 1. FIG. 5 illustrates the case of setting the interpolation constant Giqc=0. Because the command following performance of the q-axis current (torque) is deteriorated in the high-frequency band by the I-P control, the DIF of about 1 μm on one side occurs during acceleration/deceleration. Note that in FIG. 5 and later FIG. 11, and FIG. 6, a frequency DIF ripple component generated due to the dead time is removed.

Figure 11:
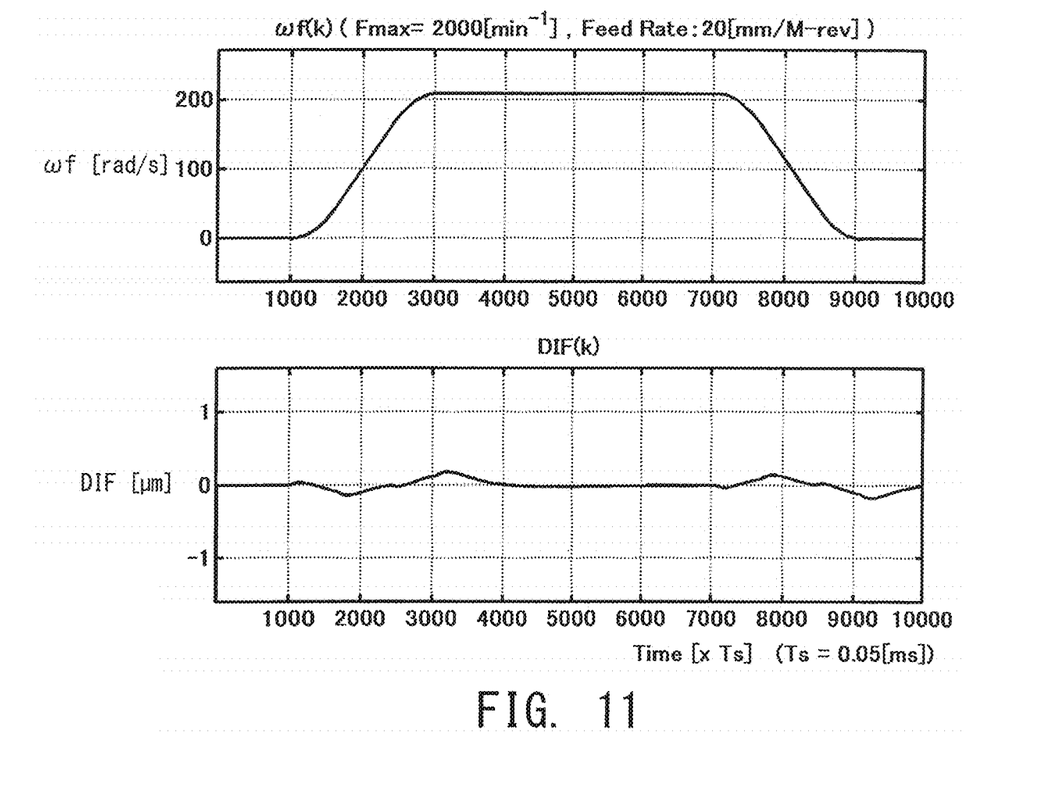
FIG. 11 is a graph showing an example of a following error during acceleration/deceleration in the position control device of the comparative example.

FIG. 11 shows the position deviation DIF when the same S-shaped acceleration/deceleration position command value X is input into the position control device 200 in FIG. 7 for comparison. Because of the PI control, the command following performance of the q-axis current (torque) is high and the DIF during acceleration/deceleration can be suppressed to about 0.2 μm on one side.

Figure 6:
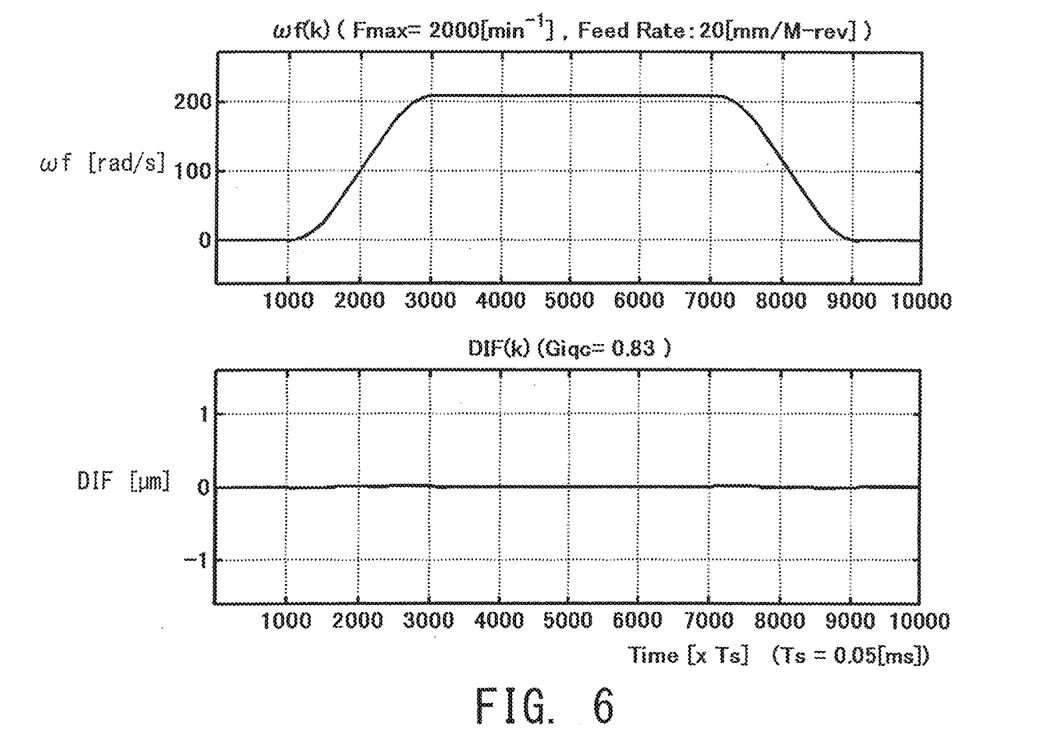
FIG. 6 is a graph showing an example of a following error during acceleration/deceleration when a q-axis current compensation amount is adjusted.

FIG. 6 shows an example when the response delay time of the q-axis current (torque) is changed by adjusting the interpolation constant Giqc so that the DIF during acceleration/deceleration is small in the position control device 10 shown in FIG. 1. The DIF during acceleration/deceleration can be suppressed to about 0.1 μm on one side and it is seen that a position synchronous relationship can be maintained even when simultaneously operated with other control axes operating under the PI control.

The above description is made on an example of the surface magnet type synchronous motor (SPM), but the technique disclosed herein is also applicable to the embedded magnet type (IPM) and reluctance type and induction motor (IM), and the same effect can be expected.

In the case of the embedded magnet type (IPM) and reluctance type synchronous motors, in the q-axis response compensation amount calculation unit 1, the amplification factor of an expression (7) is set to the differential amplifier 2 in order to calculate the time derivative value s·iq of the q-axis current from the acceleration/deceleration torque feedforward amount τf.

[Expression 7]

$$\frac{s \cdot i_q}{\tau_f} = \frac{s}{p\{\Phi_f + (L_d - L_q)i_d\}} \quad (7)$$

where p denotes the motor pair-pole number, Φf an interlinkage magnetic flux, Ld a d-axis inductance, and lq a q-axis inductance. Furthermore, an amplification ratio of the amplifier 3 becomes the q-axis inductance lq.

In the case of the induction motor (IM), the amplification factor of an expression (8) is set to the differential amplifier 2.

[Expression 8]

$$\frac{s \cdot i_q}{\tau_f} = \frac{s}{pMi_d} \quad (8)$$

where M denotes a mutual inductance of one phase. Furthermore, the amplification factor of the amplifier 3 is a leakage inductance of one phase Lσ.

The invention claimed is:

1. A position control device using a PWM inverter as a power converter and for arithmetically controlling current for an electric motor by a two-phase (d- and q-axis) rotational coordinate system, comprising:
    a subtracter for subtracting a q-axis current detection value from a q-axis current command value to output a q-axis current error;
    an adder for adding a q-axis current compensation amount for compensating for response timing of q-axis current to the q-axis current error;
    a q-axis current controller for amplifying an output of the adder by I-P control to calculate a q-axis voltage error and calculating a q-axis voltage command value on the basis of the q-axis voltage error; and
    a second adder for adding a q-axis voltage feedforward amount corresponding to a time derivative value of the q-axis current to the q-axis voltage command value to calculate a final q-axis voltage command value.

2. The position control device according to claim 1, further comprising
    a q-axis response compensation amount calculation unit for calculating the q-axis current compensation amount and the q-axis voltage feedforward amount, wherein the q-axis response compensation amount calculation unit:
    calculates a time derivative value of the q-axis current from an acceleration/deceleration torque feedforward amount;
    amplifies the time derivative value of the q-axis current to calculate the q-axis voltage feedforward amount; and
    uses a control parameter of the I-P control and an interpolation constant of a q-axis current response delay time to calculate the q-axis current compensation amount capable of arbitrarily adjusting the q-axis current error proportional to the time derivative value of the q-axis current.

\* \* \* \* \*